(12) United States Patent
Hurley

(10) Patent No.: US 10,482,793 B2
(45) Date of Patent: Nov. 19, 2019

(54) PERSONAL ARTICLE IDENTIFICATION SYSTEM

(71) Applicant: Bryan Hurley, Mount Dora, FL (US)

(72) Inventor: Bryan Hurley, Mount Dora, FL (US)

( * ) Notice: Subject to any disclaimer, the term of this patent is extended or adjusted under 35 U.S.C. 154(b) by 203 days.

(21) Appl. No.: 15/672,488

(22) Filed: Aug. 9, 2017

(65) Prior Publication Data

US 2018/0330639 A1 Nov. 15, 2018

Related U.S. Application Data

(60) Provisional application No. 62/504,018, filed on May 10, 2017.

(51) Int. Cl.

| | |
|---|---|
| *G09F 3/02* | (2006.01) |
| *B32B 7/06* | (2019.01) |
| *B32B 7/12* | (2006.01) |
| *B32B 15/08* | (2006.01) |
| *G09F 3/08* | (2006.01) |
| *A43B 1/00* | (2006.01) |
| *A43B 3/00* | (2006.01) |
| *A45F 3/04* | (2006.01) |
| *B32B 3/26* | (2006.01) |

(52) U.S. Cl.
CPC .............. *G09F 3/02* (2013.01); *A43B 1/0027* (2013.01); *A43B 3/0078* (2013.01); *A45F 3/04* (2013.01); *B32B 3/266* (2013.01); *B32B 7/06* (2013.01); *B32B 7/12* (2013.01); *B32B 15/08* (2013.01); *G09F 3/08* (2013.01); *B32B 2307/208* (2013.01); *B32B 2307/4023* (2013.01); *B32B 2307/412* (2013.01); *B32B 2519/00* (2013.01); *G09F 2003/0222* (2013.01); *G09F 2003/0267* (2013.01); *G09F 2003/0282* (2013.01)

(58) Field of Classification Search
CPC ........ G09F 3/02; A43B 1/0027; A43B 3/0078
See application file for complete search history.

(56) References Cited

U.S. PATENT DOCUMENTS

| | | | |
|---|---|---|---|
| 4,697,362 A | 10/1987 | Wasserman | |
| 6,258,200 B1 | 7/2001 | Kassab | |
| 6,481,125 B1 | 11/2002 | Pokrasoff | |
| 7,213,354 B1 | 5/2007 | Byrd et al. | |
| 7,312,388 B2 | 12/2007 | Oskorep | |
| 9,095,185 B1 | 8/2015 | Ortner | |
| 2002/0166258 A1 | 11/2002 | Posa | |

(Continued)

*Primary Examiner* — Victor S Chang
(74) *Attorney, Agent, or Firm* — Matthew G. McKinney, Esq.

(57) ABSTRACT

A personal article identification system includes a substrate having a top surface and a bottom surface, where the bottom surface is configured to be secured to a personal article and the top surface of the substrate having a first indicia. The system also includes a top layer having a top surface and a bottom surface, where the top layer overlaying the substrate and has a second indicia. The second indicia is different than the first indicia. An intermediary layer is between the substrate and the top layer. In addition, the system includes a plurality of dots forming a two dimensional patterned array in the top layer, where each of the dots is removably attached to the substrate via the intermediary layer, and when removed expose the underlying first indicia of the top surface of the substrate to create a design element in the two dimensional patterned array.

19 Claims, 4 Drawing Sheets

(56) References Cited

U.S. PATENT DOCUMENTS

| | | |
|---|---|---|
| 2006/0143951 A1 | 7/2006 | Yang et al. |
| 2007/0228091 A1 | 10/2007 | Shawen |
| 2009/0100714 A1 | 4/2009 | Coger |
| 2010/0083536 A1 | 4/2010 | Barrow |
| 2011/0101109 A1* | 5/2011 | Bona ................ G06K 19/07709 235/492 |
| 2015/0223568 A1* | 8/2015 | Ortner .................... A43B 23/24 36/48 |
| 2015/0230557 A1 | 8/2015 | Jackson |

* cited by examiner

PERSONAL ARTICLE IDENTIFICATION SYSTEM

CROSS-REFERENCE TO RELATED APPLICATIONS

This application claims priority to U.S. provisional application Ser. No. 62/504,018 filed on May 10, 2017, the contents of which are herein incorporated by reference in their entirety.

TECHNICAL FIELD

The present invention relates to the field of identification systems, and, more particularly, to a personal article identification system and related methods.

BACKGROUND

One type of personal article is footwear. Footwear typically includes an outsole of a durable material that covers the lower surface of the footwear. A midsole overlays the outsole and provides a cushioning layer. An insole overlays the midsole and provides additional cushioning. An upper is joined to a periphery of the midsole to enclose the foot of the wearer and is often formed of leather or other suitable material.

The exterior surface of the footwear is often covered with ornamental features to distinguish the line and brand of the footwear from other manufacturers. The ornamental features are identical for each particular line of footwear for the manufacturer. Accordingly, one pair of shoes for a particular line of footwear from a manufacturer is indistinguishable from another pair of shoes from that same particular line of footwear.

Some existing attempts to distinguish one pair of shoes from another includes a transparent window in an outsole that allows a removable insert to be visible within the outsole of the shoe. Another example is a footwear sole that includes two attached layers, where the first layer has an integral display element that is visible. Another example is a design that is visible through a transparent window located in the sidewall of the sole. However, the window opening weakens the sidewall and can adversely affect the durability and resiliency of the sole.

A disadvantage of the existing removable inserts in different parts of the footwear is that such inserts are not easily interchangeable. Moreover, the display inserts are often provided for their novelty or entertainment value and decrease the performance of the footwear in support and durability.

Thus, there is a need to provide customizable identification system that allows the individual to modify a personal article such as footwear for decorative and identification purposes but does not affect the performance or function of the personal article.

SUMMARY

A personal article identification system is disclosed. The system includes a substrate having a top surface and a bottom surface, where the bottom surface is configured to be secured to a personal article and the top surface of the substrate having a first indicia. The system also includes a top layer having a top surface and a bottom surface, where the top layer overlaying the substrate and has a second indicia. The second indicia is different than the first indicia. An intermediary layer is between the substrate and the top layer. In addition, the system includes a plurality of dots forming a two dimensional patterned array in the top layer, where each of the dots is removably attached to the substrate via the intermediary layer, and when removed expose the underlying first indicia of the top surface of the substrate to create a design element in the two dimensional patterned array.

In another embodiment, a personal article identification method is disclosed. The method includes providing a substrate having a top surface and a bottom surface, where the bottom surface is configured to be secured to a personal article and the top surface of the substrate has a first indicia. The method also includes forming a plurality of dots in a top layer to generate a two dimensional patterned array of dots therein, and adhering the top layer over the substrate. In addition, the method includes securing the substrate to a personal article, and removing selected dots of the plurality of dots to expose the underlying first indicia of the substrate to create a design element in the two dimensional patterned array. The plurality of dots have a second indicia different from the first indicia.

DETAILED DESCRIPTION

Figure 1:
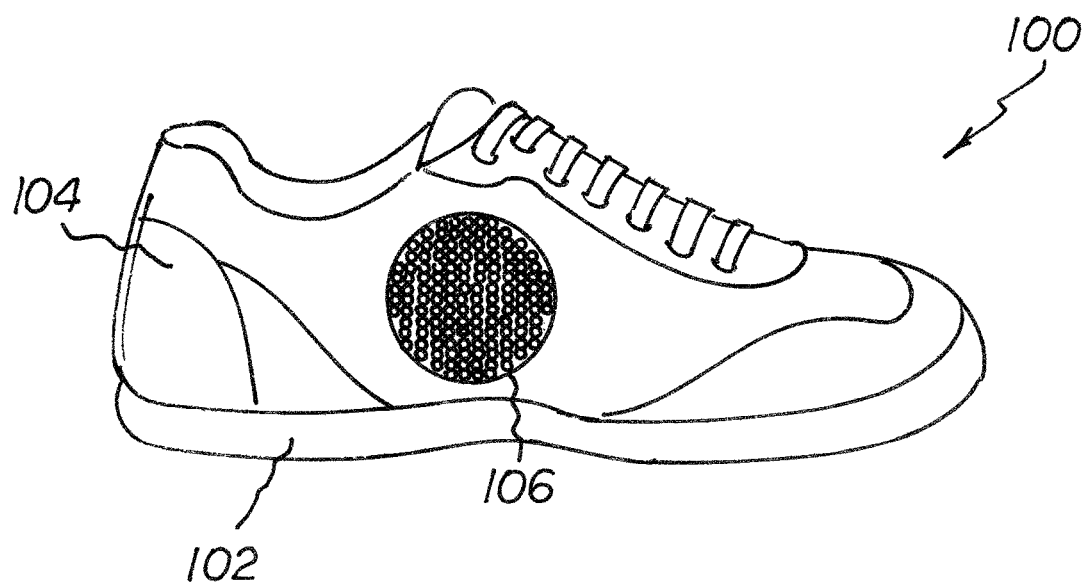
FIG. 1 is an elevational view of a shoe having a personal article identification system in accordance with an embodiment of the invention.
Figure 2:
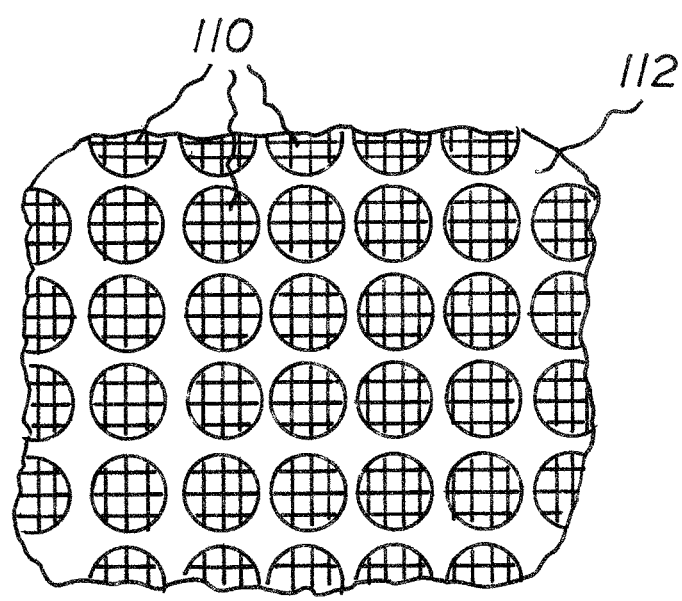
FIG. 2 is a detailed top view of a portion of a two dimensional patterned array of the identification system shown in FIG. 1.
Figure 3:
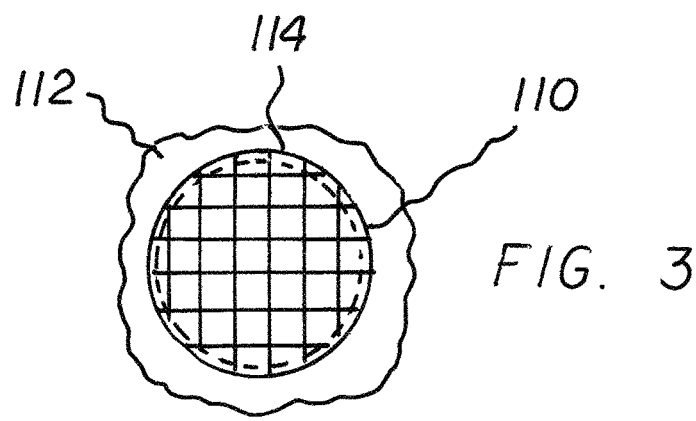
FIG. 3 is a top view of a dot of the two dimensional patterned array.
Figure 4:
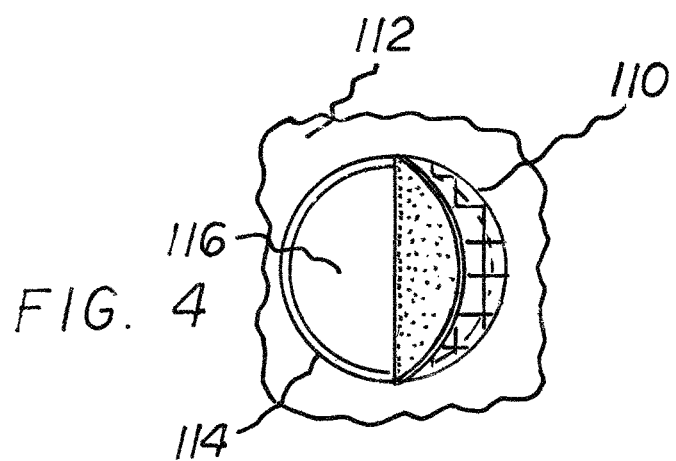
FIG. 4 is a top view of the dot of FIG. 3 being detached from an underlying substrate.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1-4, a right foot shoe 100 is shown as exemplary of a personal article, and it should be understood that similar elements may be present in a left foot shoe. Footwear according to a particular embodiment of the invention preferably includes an outsole 102, and an upper 104 having a toe-receiving portion and a heel-receiving portion.

The upper 104 includes the identification system having a two dimensional patterned array 106 of a plurality of dots 110. Although a circle shape is shown for the two dimensional patterned array 106 of the plurality of dots 110, it will be appreciated that the two dimensional array 106 may extend to the edges of the upper 104 of the footwear, and be in any desired shape.

Each of the dots 110 is composed of a material which allows for a selected dot 110 to be removed, preferably without significant effort or specialized tools. In the preferred embodiment, the dot 110 may be selectively removed by a finger of the wearer.

Depending upon the process used to produce the two dimensional patterned array 106 of the plurality of dots 110 (e.g. die cut), the dimensions would preferably be in the range of 1/8 to 1/4 inch in diameter. Although the plurality of dots 110 in this particular embodiment have a circular shape, other geometries may be used. For example, the plurality of dots 110 may be triangular, square and hexagonal, or any combination thereof. The two dimensional patterned array 106 of the plurality of dots 110 is closely packed but with enough room between each of the dots 110 that the wearer can peel off the selected dots 110 with their finger.

A color (and/or other indicia bearing design) of a top surface of the substrate 116 that is exposed when the dot 110 is removed may be a different color than the dot 110 so that design elements, patterns, school mascots can be formed. Accordingly, as shown in FIG. 5, a design can be formed in the two dimensional patterned array 106 by selectively removing dots 110 to reveal the different color of the top layer of the substrate 116 in contrast to the color of the top layer 112.

Figure 5:
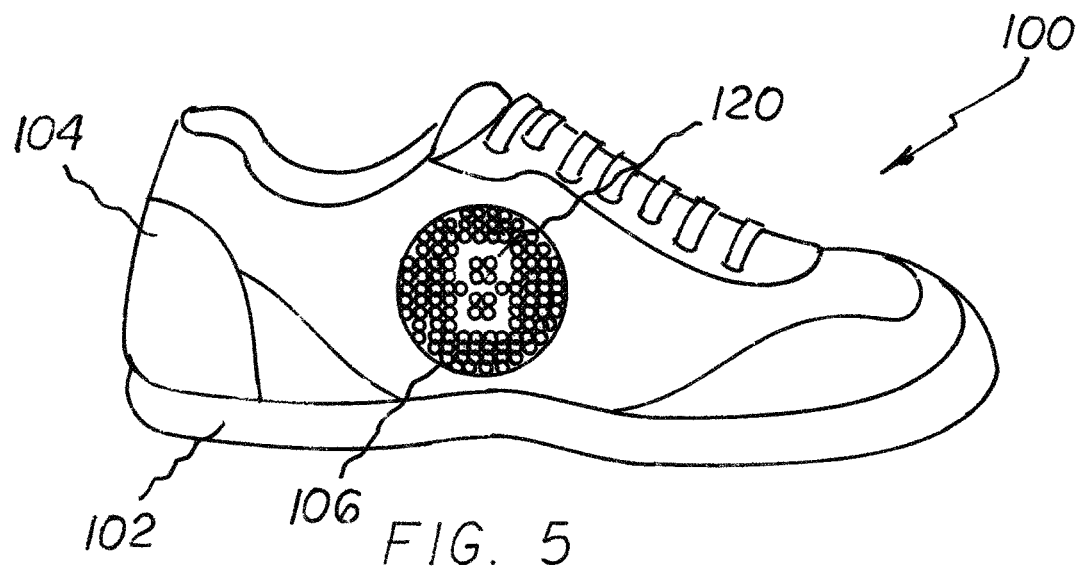
FIG. 5 is an elevational view of the identification system having been modified to produce the desired symbol.

For example, in FIG. 5, a design element 120 of the number "8" can be seen in the two dimensional patterned array 106 formed by the color of the top layer of the substrate 116 in contrast to the color of the plurality of dots 110.

Figure 6:
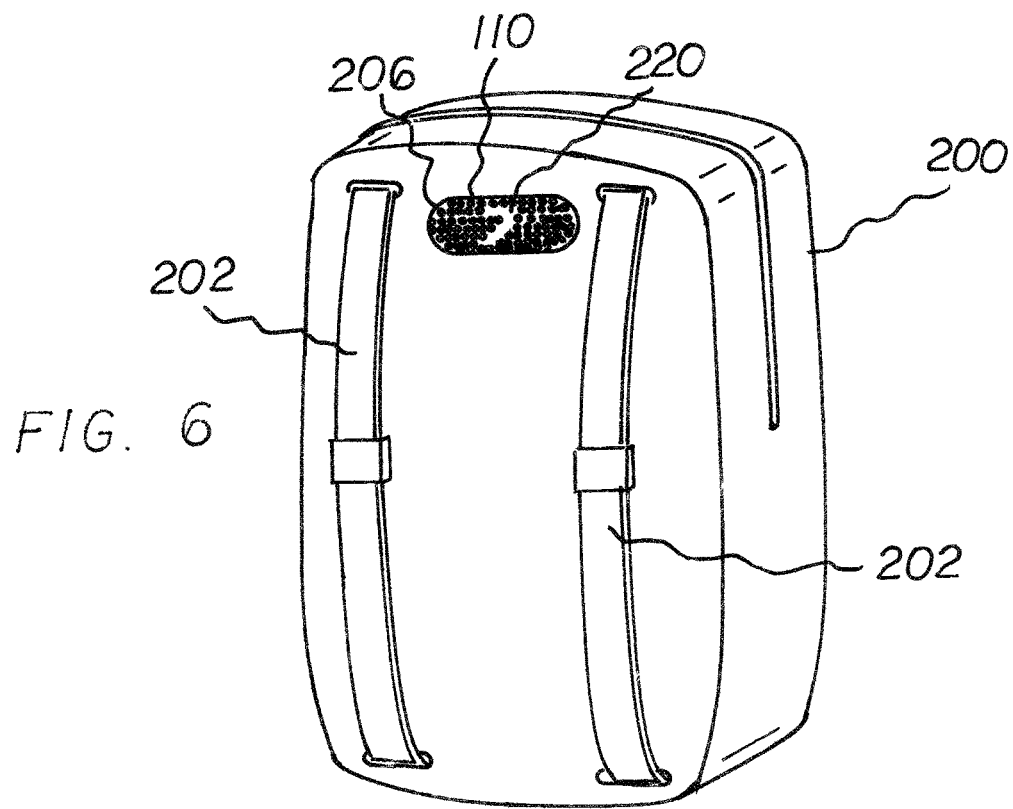
FIG. 6 is the identification system on a backpack.

In addition, the two dimensional patterned array 106 may be placed on many different items. For example, the two dimensional patterned array 206 may be placed between straps 202 on a backpack 200 as shown in FIG. 6. In this particular illustrative embodiment, the two dimensional patterned array 206 has a design element 220 of the number "7" formed by the removal of the top layer of selected dots 110.

Figure 7:
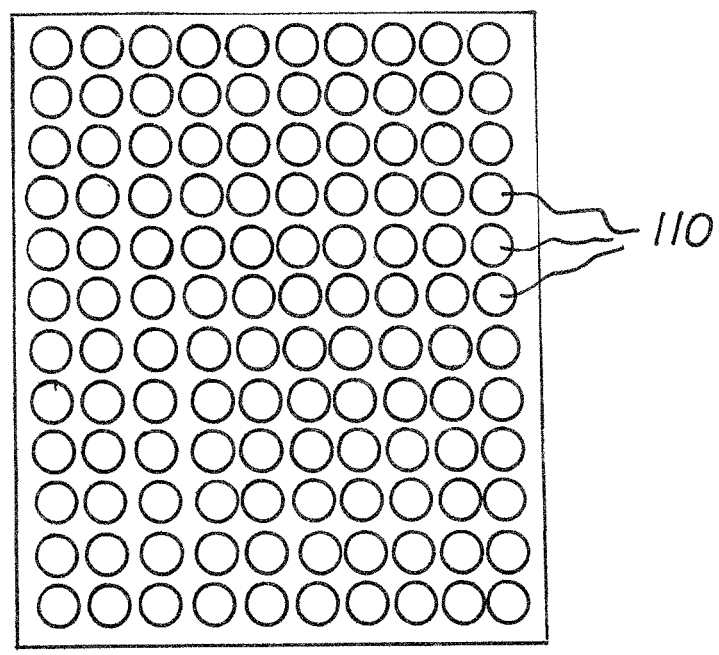
FIG. 7 is a plurality of replacement dots.

In addition, the identification system could also be secured to a children's trapper keeper, a strap on a soft sided cooler, a sunglasses case, or a piece of luggage as a few exemplary embodiments. Replacement dots 110 may also be provided separately in order to fill in the removed dots 110 to create new patterns in the two dimensional patterned array 106 as shown in FIG. 7.

Figure 8:
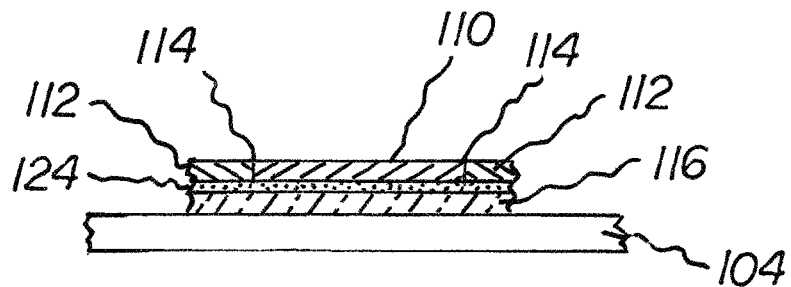
FIG. 8 is a cross sectional view of the identification system with an adhesive layer.

Referring now to FIG. 8, a partial cross section of a particular embodiment of the identification system is shown. An intermediary layer such as an adhesive layer 124 may be between a bottom surface of the top layer 112 and a top surface of the substrate 116. The adhesive layer 124 may be substantially transparent so that the color of the top surface of the substrate 116 is visible when the selected dot 110 is removed. The two dimensional patterned array 106 of the plurality of dots 110 may be formed in the top layer 112, then a bottom surface of the substrate 116 glued or otherwise secured on to the upper 104 of the shoe. The top layer 112 and the substrate 116 may each comprise a highly plasticized material.

The dot 110 is formed in the top layer 112 and defined by die cut perimeter lines 114. The cut lines 114 may be die cut, laser cut, molded, or other similar means in the top layer 112 and are configured to separate a respective dot 110 from the top layer 112. As described above, an adhesive layer 124 is between the bottom surface of the top layer 112 and the top surface of the substrate 116. The adhesive layer 124 may be transparent so that the color of the top layer of the substrate 116 is visible when the dot 110 is removed. In one aspect, the adhesive layer 124 may be releasably adhered to the top surface of the substrate 116 and fixedly adhered to the bottom surface of the top layer 112 and remain with the dot 110 so that a portion of the adhesive layer 124 under the dot 110 is removed from the top layer of the substrate 116. Alternatively, the adhesive layer 124 may be releasably adhered to the bottom surface of the top layer 112 and fixedly adhered to the top surface of the substrate 116.

Figure 9:
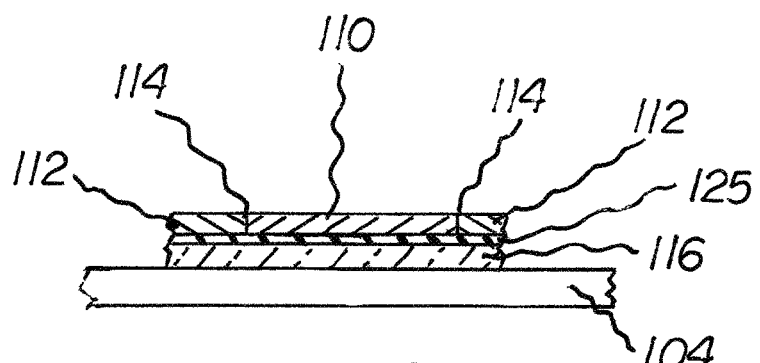
FIG. 9 is a cross sectional view of the identification system with a static cling layer.

FIG. 9 shows a cross section of another exemplary embodiment of the identification system. In particular, the adhesive layer 124 has been replaced with a static cling film 125 releasably adhered to the top surface of the substrate 116 and fixedly adhered to the bottom surface of the top layer 112. Accordingly, between the top layer 112 and the top surface of the substrate 116 there is the static cling film 125. The static cling film 125 is substantially transparent so that the indicia of the top surface of the substrate 116 is visible when the dot 110 is removed. The static cling film 125 may be fixedly adhered to either the top surface of the substrate 116, or it may be fixedly adhered to the bottom surface of the dot 110 and top layer 112.

As can be appreciated by one of ordinary skill in the art, one side of the static cling film 125 remains secured to a first surface or object, and an opposing side of the static cling film 125 is able to be removed (and replaced) from a second surface or object. If the static cling film 125 is fixedly adhered to the top surface of the substrate 116, then the bottom surface of the dot 110 has a surface material suitable to releasable adhere to the static cling film 125. Likewise, if the static cling film 125 is fixedly adhered to the bottom surface of the dot 110 instead, then the top surface of the substrate 116 has a surface material suitable to releasable adhere to the static cling film 125. The static cling film 125 allows the dot 110 to be easily peeled off, but also the dot 110 can be replaced. The top surface of the substrate 116 remains free of adhesive residue and the static cling film 125 allows the dot 110 to be adjusted when being replaced. In contrast, an adhesive only allows one chance in replacing the dot 110 to the substrate 116. The top surface 112 can then be assembled to the substrate 116 without and additional adhesives and only using static cling forces.

Figure 10:
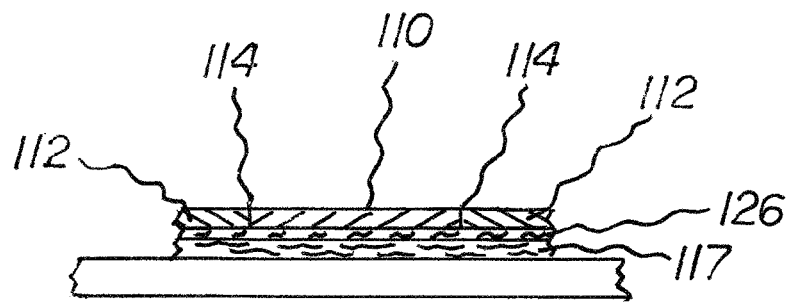
FIG. 10 is a cross sectional view of the identification system with a magnetic layer.

FIG. 10 illustrates another exemplary embodiment of the identification system. Instead of an adhesive layer 124 or a static cling film 125, a magnetically receptive layer 126 is interposed between the top surface of magnetized substrate 117 and the dot 110. The magnetically receptive layer 126 may be a metal paper and the substrate 117 may comprise a metal film.

The top layer 112 and magnetically receptive layer 126 may be formed as a sheet and then die cut to form the dots 110 therein and two dimensional patterned array 106 described above. The top surface 112 can then be assembled to the magnetized substrate 117 having an opposite polarity of the magnetically receptive layer 126 without any additional adhesives and only using magnetic forces. The substrate 117 and/or the magnetically receptive layer 126 may comprise a film of metal. Thus, the first indicia may be etched into the film of metal.

One aspect of the invention is directed to a personal article identification method. The method includes providing a substrate having a top surface and a bottom surface, where the bottom surface is configured to be secured to a personal article and the top surface of the substrate has a first indicia.

The method also includes forming a plurality of dots in a top layer to generate a two dimensional patterned array of dots therein, and adhering the top layer over the substrate. In addition, the method includes securing the substrate to a personal article, and removing selected dots of the plurality of dots to expose the underlying first indicia of the substrate to create a design element in the two dimensional patterned array. The plurality of dots have a second indicia different from the first indicia.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A personal article identification system comprising:
   a substrate having a top surface and a bottom surface, the bottom surface configured to be secured to a personal article, and the top surface of the substrate having a first indicia;
   a top layer having a top surface and a bottom surface, the top layer comprising a second indicia on the top surface and overlaying the substrate;
   an intermediary layer between the substrate and the top layer; and
   a plurality of dots forming a two dimensional patterned array in the top layer, each of the dots is removably attached to the substrate via the intermediary layer, and when removed expose the underlying first indicia of the top surface of the substrate to create a design element in the two dimensional patterned array;
   wherein the first indicia comprises a first color, and the second indicia comprises a second color in contrast to the first color, and the first color on the substrate is exposed when a plurality of selected dots are removed to define the design element.

2. The personal article identification system of claim 1, wherein the intermediary layer comprises a substantially transparent adhesive layer.

3. The personal article identification system of claim 1, wherein the intermediary layer comprises a substantially transparent adhesive layer releasably adhered to the top surface of the substrate.

4. The personal article identification system of claim 1, wherein the intermediary layer comprises a substantially transparent adhesive layer releasably adhered to the bottom surface of the top layer.

5. The personal article identification system of claim 1, wherein the intermediate layer comprises a substantially transparent static cling film releasably adhered to the top surface of the substrate.

6. The personal article identification system of claim 1, wherein the intermediary layer comprises a substantially transparent static cling film releasably adhered to the bottom surface of the top layer.

7. The personal article identification system of claim 1, wherein the intermediate layer comprises a magnetically receptive layer; and
   the substrate being magnetized of an opposite polarity of the magnetically receptive layer.

8. The personal article identification system of claim 1, wherein the top layer and the substrate each comprise a plasticized material.

9. The personal article identification system of claim 1, further comprising a personal article, the bottom surface of the substrate secured thereto.

10. The personal article identification system of claim 1, wherein each dot of the plurality of dots comprises a circular shape.

11. The personal article identification system of claim 1, wherein each dot of the plurality of dots comprise a die cut perimeter configured to separate a respective dot from the top layer.

12. The personal article identification system of claim 7, wherein the substrate comprises a film of metal.

13. The personal article identification system of claim 12, wherein the first indicia is etched into the film of metal.

14. A personal article identification system comprising:
    a substrate having a top surface and a bottom surface;
    a top layer having top surface and a bottom surface and overlaying the substrate;
    an intermediary layer between the substrate and the top layer; and
    a plurality of dots forming a two dimensional patterned array in the top layer and the intermediary layer, each of the dots is removably attached to the substrate via the intermediary layer.

15. The personal article identification system of claim 14, wherein the intermediary layer comprises a substantially transparent adhesive layer.

16. The personal article identification system of claim 14, wherein the intermediary layer comprises a substantially transparent static cling film releasably adhered to the top surface of the substrate.

17. The personal article identification system of claim 14, wherein the intermediate layer comprises a magnetically receptive layer; and
    the substrate being magnetized of an opposite polarity of the magnetically receptive layer.

18. A personal article identification method comprising:
    providing a substrate having a top surface and a bottom surface, the bottom surface configured to be secured to a personal article, and the top surface of the substrate having a first indicia;
    forming a plurality of dots in a top layer to generate a two dimensional patterned array of dots therein;
    adhering the top layer over the substrate;
    securing the substrate to a personal article; and
    removing selected dots of the plurality of dots to expose the underlying first indicia of the substrate to create a design element in the two dimensional patterned array.

19. The method of claim 18, wherein the plurality of dots having a second indicia different from the first indicia.

* * * * *